(12) United States Patent
Flood et al.

(10) Patent No.: US 6,388,617 B1
(45) Date of Patent: May 14, 2002

(54) RADIO BEACON WITH A GPS INTERFACE FOR AUTOMATICALLY ACTIVATED EPIRBS

(75) Inventors: John F. Flood; Richard C. Havens, both of Plantation; Robert Schmidt, Hollywood, all of FL (US)

(73) Assignee: ACR Electronics, Inc., Fort Lauderdale, FL (US)

( * ) Notice: Subject to any disclaimer, the term of this patent is extended or adjusted under 35 U.S.C. 154(b) by 0 days.

(21) Appl. No.: 09/410,396

(22) Filed: Oct. 1, 1999

Related U.S. Application Data

(60) Provisional application No. 60/102,798, filed on Oct. 2, 1998.

(51) Int. Cl.$^7$ .............................. G01S 1/08; G01S 5/02; H04B 7/185
(52) U.S. Cl. .................... 342/386; 342/357.06
(58) Field of Search ........................... 342/386, 357.06, 342/357.09, 357.17

(56) References Cited

U.S. PATENT DOCUMENTS

| | | | |
|---|---|---|---|
| 5,367,306 A | * 11/1994 | Hollon et al. ............... | 342/386 |
| 5,517,199 A | * 5/1996 | DiMattei ................ | 342/357.09 |
| 6,222,484 B1 | * 4/2001 | Sciple et al. ........... | 342/357.09 |

* cited by examiner

Primary Examiner—Thomas H. Tarcza
Assistant Examiner—Fred H. Mull
(74) Attorney, Agent, or Firm—Malin, Haley & DiMaggio, P.A.

(57) ABSTRACT

An emergency position information radio beacon utilized in conjunction with a global positioning system that receives latitude and longitude information continuously in which the GPS data is periodically transferred into the EPIRB before activation in order to preserve battery power in the EPIRB. The EPIRB includes a first micro controller that is connected by an electro/optical data input to the GPS with the first micro controller being a very low power drain. Periodically, such as every 10 minutes, latitude and longitude information is transferred from the GPS into the EPIRB memory after which the EPIRB memory and system is maintained in a sleep mode with no power consumption. This insures that the EPIRB has geographical position information data before activation that can be transmitted with the emergency signal to search and rescue at the same time preserving the battery power of the EPIRB which is utilized only during the emergency period. The system is power off 99.99% of the time preserving the EPIRB battery.

1 Claim, 1 Drawing Sheet

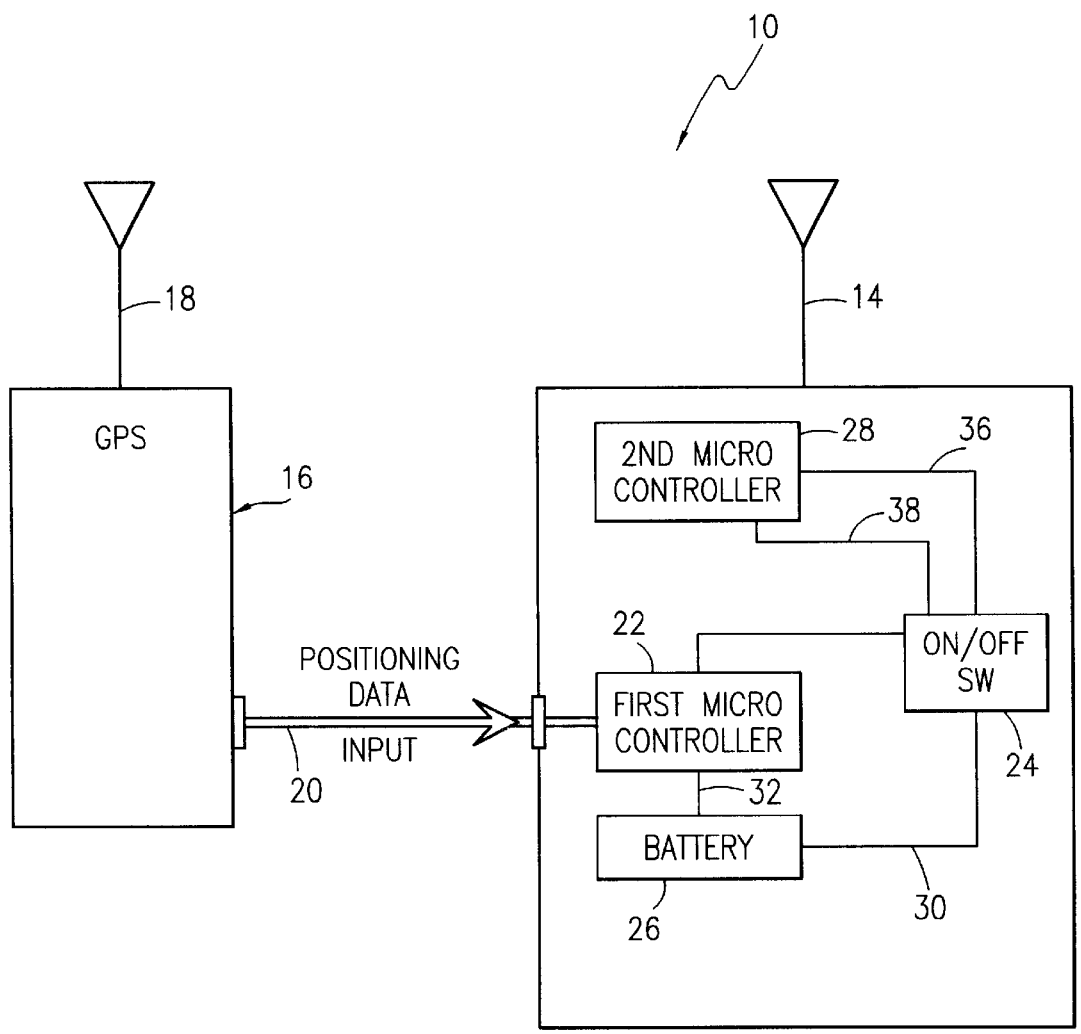

RADIO BEACON WITH A GPS INTERFACE FOR AUTOMATICALLY ACTIVATED EPIRBS

CROSS-REFERENCE TO RELATED APPLICATIONS

This application claims benefit of Provisional appln No. 60/102,798 filed Oct. 21, 1998.

STATEMENT REGARDING FEDERALLY SPONSORED RESEARCH OR DEVELOPMENT

N/A.

BACKGROUND OF THE INVENTION

1. Field of the Invention

This invention relates to emergency position information radio beacons (EPIRBs) that are used to send an emergency signal from a ship or vessel in trouble, seeking help, and in particular to an EPIRB that can interface a global positioning system (GPS) to receive input data (latitude and longitude data) stored in memory in the EPIRB the EPIRB is activated, saving battery power.

2. Description of Related Art

The use of EPIRBs for emergency vessels is well known. Typically an EPIRB is a RF transmitter that transmits R.F. signals on one or more frequencies, normally an emergency band frequency, to notify either surrounding ships, aircraft and even satellites that a vessel is in trouble. EPIRBs can be either manually turned on once an emergency is established or, automatically turned on by contact with the ocean or water, which is self-activating. Also known is the use of a global position system (GPS) that is used with the NAVSTAR system or GLONASS system having satellites that can provide very accurate latitude and longitude geographical positions of location for someone having a GPS receiving device. Typically, three or more satellites in orbit provide triangulation to the hand-held or ship installed unit giving instantaneous and continuous latitude and longitude information.

Although the use of providing an EPIRB with exact current location GPS data in real time would be useful for transmitting a signal during an emergency manually, there are circumstances such as during an emergency wherein the EPIRB would be automatically activated by water (i.e. sinking of the ship) that would be impractical to obtain a current GPS position inputted to the EPIRB because the GPS unit would be physically disengaged from the EPIRB on the sinking ship, or under water. Continuously monitoring the GPS by an activated EPIRB before an emergency would drain the battery of the EPIRB, limiting its usefulness when an emergency occurs.

The present invention overcomes this problem by providing a battery powered EPIRB that can be automatically activated during an emergency by water (or other physical event) while at the same time providing a method and apparatus for storing and maintaining a relatively current GPS input position data within the EPIRB without consuming sufficient continuous battery power that would defeat the purpose of the EPIRB system.

U.S. Pat. No. 5,319,376 issued to Eninger, Jun. 7, 1994 shows an artic submarine buoy and application methods that deploy an EPIRB for use with a global positioning system for a disabled submarine that is trapped under the ice cap to give its position and signal for emergency help. U.S. Pat. No. 5,724,045 issued Mar. 3, 1998 to Kawakami shows a radio transponder that functions as a SART in an emergency condition and as a GPS receiver and VHF transceiver for non-emergency conditions. Neither of these patents show or teach the present invention which allows for periodic GPS input to an EPIRB to reduce battery usage to greatly extend the battery time, prior to EPIRB activation. U.S. Pat. No. 5,355,140, issued Oct. 11, 1994, shows an emergency reporting for marine and airborne vessels that uses GPS and an EPIRB transmitter.

BRIEF SUMMARY OF THE INVENTION

This invention relates to an emergency position information radio beacon (EPIRB) that can be interfaced to receive data from an existing GPS system, before the EPIRB is activated in an emergency. The EPIRB includes a first microprocessor that is continuously powered by the beacon battery at all times, whether the EPIRB is activated or not. The first microprocessor in the EPIRB includes a very low clock rate. Such a clock rate could be 480 khz for low power. The first microprocessor also includes firmware circuitry that provides a sleep mode (almost all of the time) which after a fixed time period, such as ten minutes, wakes up, looks around, loads the new GPS input in position information (latitude and longitude) into the EPIRB memory and then shuts down. This means that the EPIRB unit is power off 99.99 percent of the time, even though every ten minutes, the EPIRB receives location information from the GPS. The result is that the non-activated EPIRB includes position information from a GPS on the vessel that is no older than ten minutes. If an emergency occurs such that the EPIRB is activated by water, meaning that there is an emergency, the memory in the EPIRB contains GPS position data of latitude and longitude that is no older than ten minutes as received by the first microprocessor. At this point during the emergency, once the EPIRB is activated and turned "00", a second microprocessor in the EPIRB is activated and powered by the battery allowing the EPIRB to transmit not only emergency signaling data but also the last stored known latitude and longitude data of the vessel received into the EPIRB memory from the first microprocessor before the EPIRB was activated.

The use of the invention preserves EPIRB battery while at the same time providing positional information that is ten minutes old or less (or other suitable periodic entry) inside the EPIRB. The drawing shows a GPS unit that has a positioning data input interface which could be electrical or optical or any other type of input data that is interfaced to an EPIRB housing that includes the first micro controller attached to the battery. Because of the low clock rate, the first micro controller is powered at all times as to the clock, and every ten minutes for a short period of time loads data in memory from the GPS and then shuts off again. A second micro controller is the part of the EPIRB system that is activated automatically (by a water-activated switch) that turns on the EPIRE unit providing battery power to the entire system, transmitting emergency signals and latitude and longitude information.

Since C/S beacons must operate from a self-contained power source (battery), it is of utmost importance that the GPS interface circuits and EPIRB memory consume negligible amounts of power. The present embodiment of the invention utilizes two micro controllers in a power saving arrangement. The first very low power/low clock rate micro controller receives input data via an electro/optical interface with the GPS and stores the GPS positioning data in the EPIRB memory before activation for subsequent transmission of the emergency signal and the vessel position in an emergency. By use of very low power circuit design and firmware that puts the first micro controller and supporting circuits in a sleep mode for the vast majority of time, power consumption from the battery is reduced to a negligible level while maintaining current GPS data in beacon memory.

The first micro controller is continuously powered by the beacon battery at all times, whether the EPIRB is activated or not.

The second micro controller is used for all EPIRB/beacon control and data processing functions once the beacon is activated in an emergency. It operates at a standard clock rate, typically 16 mhz and at high power to control all beacon functions and internal beacon calculations. The second micro controller is powered only when the beacon has been activated by the emergency such as being immersed in water.

While the two micro controller implementation is preferred, a single micro controller design may be accomplished employing a slightly higher battery power drain.

The method of the invention includes a radio beacon system that has a data input interface with an activated GPS that periodically transfers current GPS geographical data into the EPIRB memory prior to beacon activation. The method also includes using two micro controllers for very low power consumption using sleep firmware to keep power consumption low. The method may also include electro/optical infrared interface (wireless) for improved beacon waterproofing (no input holes in the beacon housing).

In the prior art, the radio beacon was stored in a power-off mode to conserve the battery power but was connected to a GPS positioning data source. Upon activation of the beacon, which would be manually, the GPS data would be transferred to the beacon by an input connection. This situation can work under conditions where there is sufficient time to maintain the connection between the GPS and the EPIRB and the device is manually activated.

However, there are situations for the present invention wherein under an emergency condition the EPIRB could be disconnected from its GPS unit without warning such as fire, capsizing and explosion, in which case the GPS data may not have time to transfer to the beacon after activation and the GPS connection is broken. Under that condition, no GPS position data would be available to be stored in the beacon for transmission to Search and Rescue (SAR) authorities. Using the present invention, the latitude and longitude position from the GPS is stored prior to activation of the EPIRB.

With EPIRBs that have automatic activation, certain types of ships are required to carry beacons that deploy automatically when a ship sinks and submerges the beacon to a depth of up to 4 meters. Prior to reaching the 4 meter depth, the beacon is required to automatically release from the ship and to automatically activate in water. Under these conditions the beacon is under water when it activates and such a condition will certainly disable a connected GPS before position coordinates are transferred to the automatically activated beacon. Under these conditions no GPS position would be stored in the beacon for transmission to SAR authorities. However, using the present invention, with the latitude and longitude stored continuously and periodically within at least ten minutes of the last position of the ship prior to activation of the is beacon, when the EPIRB is activated, it will have in memory the important geographical position information that can be transmitted to third parties giving an almost exact location of where the stranded vessel is located.

It is an object of this invention to provide an improved emergency device especially for marine use which utilizes an EPIRB in combination with a navigational system such as GPS, which greatly extends the useful battery time while still maintaining an update of the EPIRB location from the GPS prior to activation of the EPIRB in an emergency situation.

BRIEF DESCRIPTION OF THE DRAWINGS

The drawing shows a schematic diagram that shows the structure and operation of the present invention.

PREFERRED EMBODIMENT OF THE INVENTION

Referring now to the drawing, the present invention is shown generally at 10, comprised of an emergency position indicating radio beacon (EPIRB) 12 which includes an antenna 14 for transmitting an emergency signal on a predetermined frequency in case of an emergency. During an emergency such as when a ship sinks, the EPIRB can be manually actuated by turning the power on or automatically switched on by a water activating switch that when an EPIRB contacts the ocean or body of water, the power to the unit will be turned on automatically and emergency signals begin transmitting from antenna 14. In a conventional EPIRB the battery is in an off position to preserve the battery at all times until activated for the actual emergency. Thus, the shelf life can often be years for an EPIRB and its battery since the EPIRB is not activated until an actual emergency.

One of the critical factors in an emergency in the ocean is to locate the person or persons after the ship has sunk or another emergency has occurred. Finding people in the ocean can be very difficult because of its huge size. In recent years, the global positioning system which uses satellites, greatly increases the accuracy of providing latitude and longitude from the satellite signals to a GPS device.

The present invention uses a conventional global positioning system (GPS) 16 that includes an antenna 18 for receiving signals from the satellites in order to determine current position. Also a GPS data input or wireless infrared data interface 20 provides geographical data from GPS 16 into a first micro controller 22 that is housed in the EPIRB 12. Note that the data input does not have to be a wire but is sent by wireless infrared or electro/optical signals so that there is no physical connection between the GPS 16 and the EPIRS 18 such that when an emergency occurs someone would not have to manually disconnect GPS 16 from the EPIRB 12.

One of the problems in the prior art was that under an emergency condition of manual activation, the GPS was is connected from the EPIRB without warning and the GPS data may not have time to transfer to the beacon after manual activation. Also, if the systems were tethered together under water to depths up to four meters, obviously no GPS position would be stored in the EPIRB.

Using the present invention as shown, the first micro controller 22 is a very low power/low clock rate micro controller which interfaces by electro/optical interface with the GPS input and stores GPS position data prior to EPIRB activation for later transmission to Search and Rescue (SAR) authorities during an emergency. It is of extreme importance that the GPS data input interface circuit and memory consume negligible amounts of electrical power. This is because the EPIRB must operate from a self contained power source. By use of very low power circuit design and firmware, the first micro controller and supporting circuits are put in a sleep mode for the vast majority of time (99.99%) thereby reducing power consumption to a negligible level while maintaining periodically (i.e., every ten minutes) current GPS input data in the beacon in memory. The first micro controller is powered by the beacon battery 26 at all times whether the beacon is activated or not through wire 32.

The EPIRB includes a second micro controller 28 that is used for all beacon control and data processing functions. The micro controller 28 operates at a standard clock rate and at high power to control all beacon functions and internal beacon calculations. The second micro controller 28 is powered only when the beacon is activated as during an emergency.

Although two separate micro controllers are preferred, a single micro controller design could be accomplished with a slightly higher power drain. The second micro controller 28 which controls the heart of the EPIRB when it is activated for sending emergency signals and position location through antenna 14, is controlled by an on/off switch 24 which allows power from battery 26 through circuit 30 and 36 to the second micro controller, the EPIRB memory and transmitter circuits. Switch 24 may be turned on manually, signifying an emergency, or it could be water activated when the EPIRB strikes the water during an emergency.

In accordance with the present invention, the GPS 16 provides position locating data on a periodic schedule, such as every 10 minutes, through electro optical input 20 into the first micro controller memory and memory in the EPIRB 12.

The first microprocessor 22 utilizes a very low clock rate such as 480 khz for low power. The first microprocessor utilizes firmware that provides a sleep mode almost all the time, which, after a fixed time period which is 10 minutes, wakes up, looks around, loads the new GPS input position information into memory and then shuts down. The result is that the unit is off 99.99% of the time, even though every 10 minutes it looks for information. The non-activated EPIRB then has geographical position information from the GPS on the vessel, that is no older than 10 minutes.

In operation, after a predetermined time period which is controlled by the first micro controller 22, every periodic cycle, such as 10 minutes, latitude and longitude data is received from the GPS and transferred into the EPIRB memory, and then the system is shut down. Battery 26 is then preserved since a miniscule amount of power is being utilized for the first micro controller 22.

Should an emergency occur and the EPIRB 12 is in the ocean, it will have latitude and longitude information that is no older than 10 minutes that can be transmitted from antenna 14 with the emergency beacon signals to immediately tell search and rescue the latitude and longitude of the vessel.

In the drawing, the second micro controller circuitry 28 is connected to the R.F. signal generator and transmitter circuitry and the first micro controller 22 is connected to memory.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. An emergency position information radio beacon having a global positioning system data interface comprising:

a waterproof housing;

radio frequency transmitter and frequency generating circuit mounted within said housing;

radio frequency antenna connected to said housing and electrically connected to said transmitting signal circuit;

a battery power supply;

an electrical switch connected to said battery;

a first low power, low clock rate micro controller mounted in said housing and including a global positioning system data input interface connected to said housing and to said first micro controller;

said first micro controller connected to said battery, said battery providing power at all times to said first micro controller;

means for continually periodically transferring geographical position data from a global positioning system to the radio beacon memory before the beacon is activated;

means for activating the beacon in an emergency situation;

said first micro controller includes firmware that provides a periodic sleep mode and a periodic awake mode such that the power is off more than 98 percent of the time;

means for listening for and storing latitude and longitude position data from said global positioning system data interface in said first microprocessor for a predetermined periodic short period of time to obtain position information on a periodic basis that is stored in said first micro controller; and means for not listening for and not storing position data in said first micro processor for a predetermined periodic long time period, much longer than the time for listening for and storing said position data, in order to save battery power whereby said periodic awake mode and said periodic sleep mode is such that the power is off during the periodic sleep mode more than ninety-eight percent of the time while still providing periodic latitude and longitude input data to said system at a predetermined schedule.

* * * * *